March 19, 1963  W. F. GRIFFIN ETAL  3,082,115
METHOD OF AND APPARATUS FOR SPRAYING CATHODES
WITH EMISSIVE MATERIALS
Filed Oct. 20, 1960  2 Sheets-Sheet 1
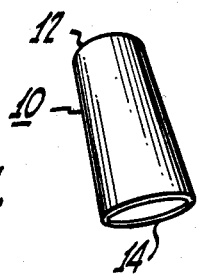
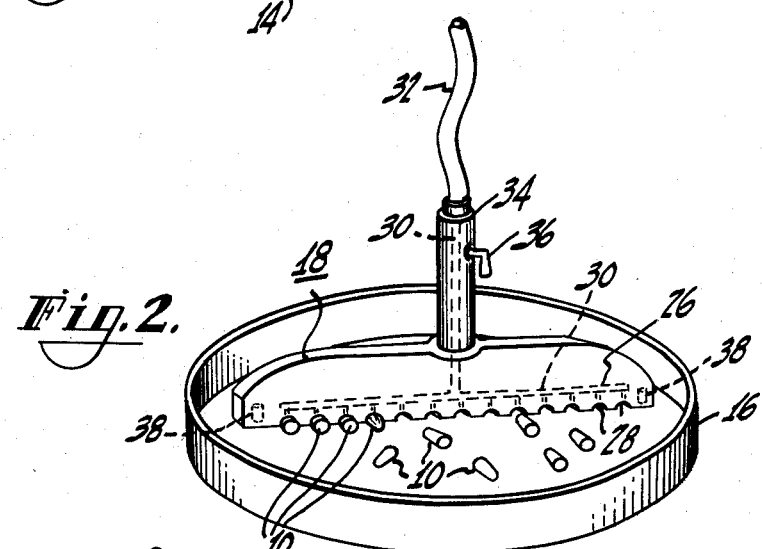
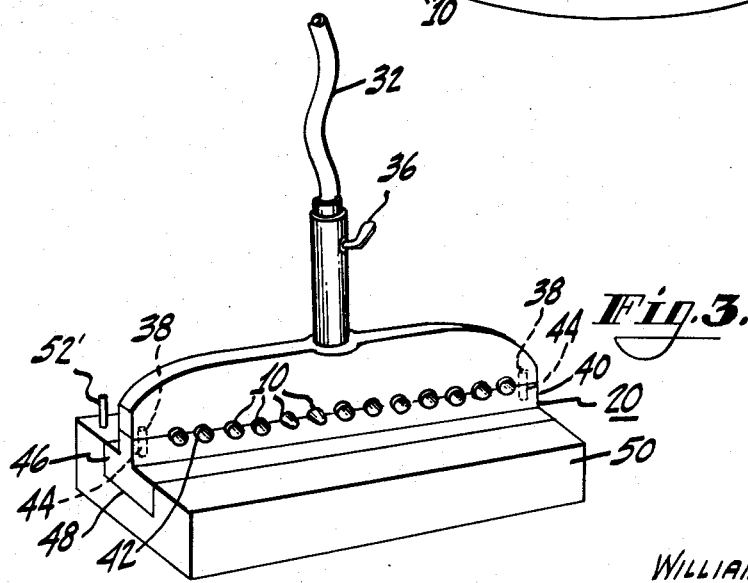
INVENTORS
WILLIAM F. GRIFFIN &
JAMES F. MILLER
BY William A. Zalesak
ATTORNEY

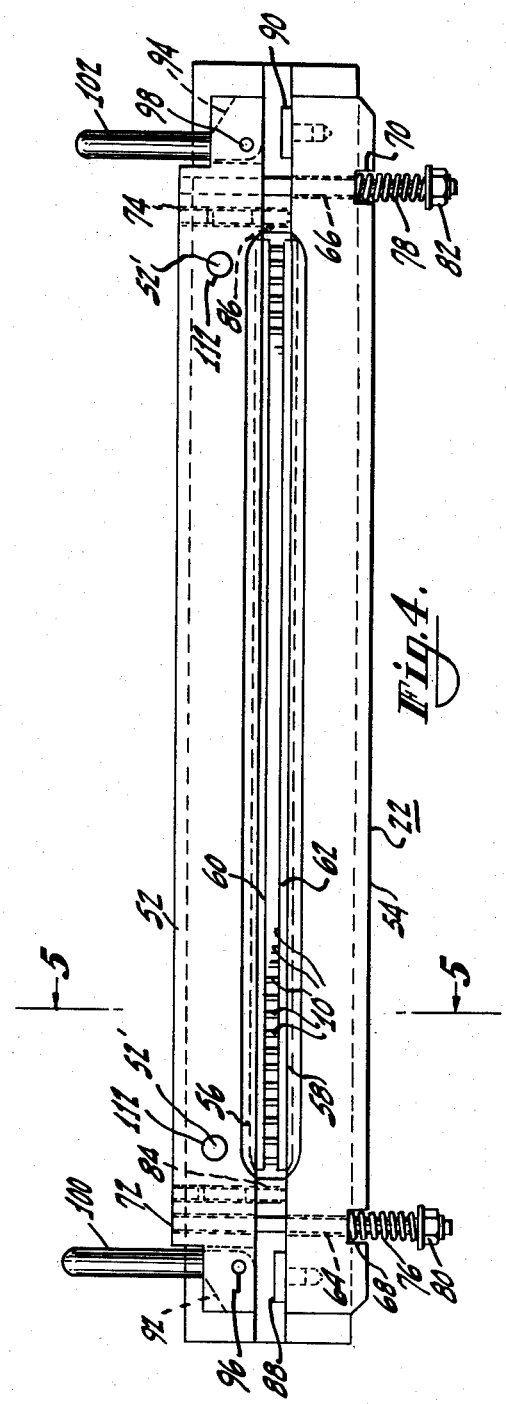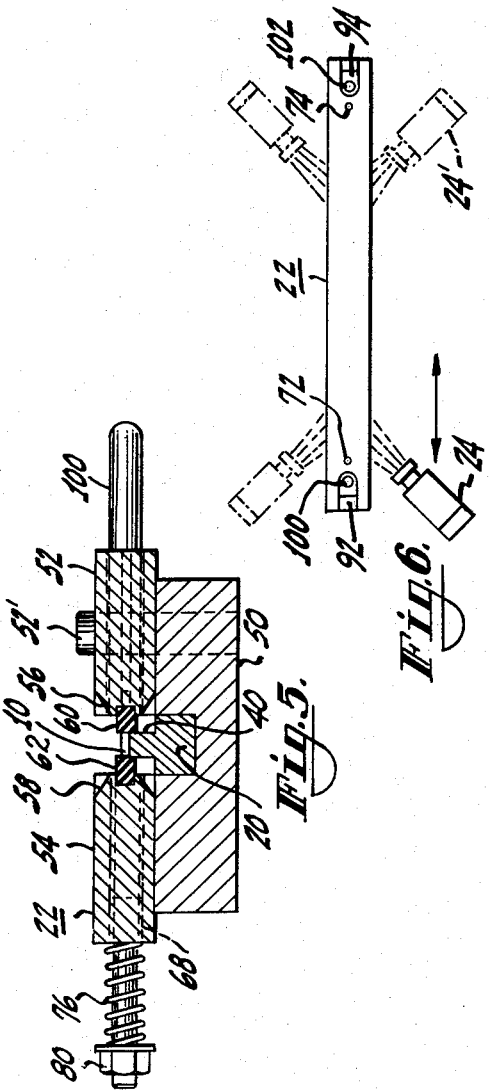

United States Patent Office 3,082,115
Patented Mar. 19, 1963

3,082,115
METHOD OF AND APPARATUS FOR SPRAYING CATHODES WITH EMISSIVE MATERIALS
William F. Griffin, Summit, and James F. Miller, Smoke Rise, N.J., assignors to Radio Corporation of America, a corporation of Delaware
Filed Oct. 20, 1960, Ser. No. 63,815
12 Claims. (Cl. 117—38)

This invention relates to a method of an an apparatus for coating electron tube cathodes with electron emissive materials to provide an electron emissive coating thereon.

In one form of concentric type of electron tube, an open tubular cathode support sleeve is arranged concentrically with an open tubular grid or grids and an open tubular anode. The anode, grid or grids and cathode sleeve are assembled and fixed in position with respect to each other by brazing these tube elements to support means. Since the electron emitting material comprising the surface of a cathode will not withstand brazing temperatures, a cathode is added to the assembly comprising the anode, grid or grids and cathode support after the brazing operation. To facilitate the assembly of the cathode and the cathode sleeve and to hold it tightly thereon, the cathode comprises a hollow cylindrical member which is very slightly tapered in shape. The small end is closed. This cathode is slipped over the end of the cathode sleeve or support after the brazing operation referred to above is completed. It is therefore noted that while the cathode is axially symmetrical, it changes shape along the length of the axis. Since the grid or grids and the anode comprise open-ended cylinders, any electron emissive material on the end of the cathode, upon proper heating thereof, would emit electrons over which there would be little or no control. Therefore, no electron emsisive material should be deposited on the closed end of such a cathode.

Due to the small tolerances permitted in the referred to concentric type electron tubes, any electron emissive material that enters into the open end of the cathode might disturb the fit between the cathode support sleeve and the cathode and result in non-concentricity of the cathode, grid or grids and anode, when, after brazing, the cathode is thrust over the cathode sleeve. This of course would effect uniformity of tube characteristics from tube to tube. Therefore, no electron emitting material should be deposited inside the open end of the cathode sleeve.

Not only are the cathodes here considered sometimes not uniform in shape along their length but they are extremely small. A cathode may be less than 1/16 of an inch in diameter and about 3/16 of an inch long. Therefore orientation thereof to have all the closed ends of the cathodes directed in the same direction is difficult. Furthermore, the cathodes are not always uniform in all dimensions. It can be seen that aplying a uniform coat of electron emitting material to such a cathode without applying any emitting material on the closed end or inside of the open end thereof is a difficult, time consuming, and expensive procedure requiring highly skilled operators.

At the present time, in the process of applying an emissive coating to the cathode, the cathode is placed over a pin. This requires orientation of the cathode with the closed ends of the cathodes all in the same direction. To prevent emissive material from being deposited on the closed end of the cathode, a spraying shield is put over the closed ends thereof. The spraying shield which is fixed above the cathodes must fit the closed end of the cathodes to shield them during the spraying operations. The pins on which the cathodes are placed are rotated while the cathodes are sprayed to present an ever changing surface to the spray gun whereby a uniform coating of the emissive material is built up on the cathodes. If the spray shield fits the closed end of the cathodes too closely, turning of the cathodes upon rotation of the pins on which they are mounted will be prevented. If the fit is too loose, spray material will be deposited on the cathode ends. Also, the spray shield must be built to fit the longer cathodes whereby the fit on the shorter cathodes is too loose to protect them from the spray. Therefore, a certain amount of emissive coating on the closed end of some of the cathodes occurs with this method of spraying. Furthermore, if the cathode is a little oversize, the cathode will not fit a rotatable pin properly and spray material will find its way inside the cathode sleeve. Also, such oversize cathode sleeves which fit their rotating pins too loosely may remain stationary and not rotate with the pin on which it is mounted, whereby the cathode is sprayed only on one side thereof. If the cathode is a little undersized in diameter, difficulty may occur in putting the cathode onto or in taking it off of its pin. It will be seen that the present system of spraying cathodes is not easily adaptable to different designs of cathodes, since the pin sizes and shield shape must be changed in accordance with the size and shape of the redesigned cathodes. Also, the present system of spraying requires expensive fixtures, since each cathode support pin must be carefully sized and must be arranged to be rotated and the spray shield must be made very carefully. It is therefore evident that the present system and apparatus for spraying cathodes of the type described is not fully satisfactory.

It is therefore an object of this invention to provide a novel method and apparatus for spraying cathode coatings on cathode sleeves which method and apparatus do not require end for end orientation of the sleeves.

It is another object to provide a method and apparatus for spraying cathode sleeves uniformly and without depositing any cathode material on the ends or inside of the sleeves during the spraying process.

It is a still further object to provide an apparatus and method for spraying cathodes uniformly and without using expensive jigs or fixtures.

Another object of this invention is to provide a method and an apparatus for spraying cathodes that vary in length or in diameter or in both.

A further object of this invention is to provide a method and apparatus for spraying cathodes of varying design without the necessity of changing the method or the apparatus.

One apparatus according to this invention includes a spray bar assembly for holding the cathodes during spraying operation and a cooperating holding rack for holding cathodes in parallel relationship for loading the spray bar assembly. The spray bar comprises a pair of elongated members each having inserts of resilient material set in a face thereof and spring means for urging the members together whereby cathodes amy be clamped between the resilient inserts. The holding rack comprises a bar which may have a plurality of grooves in an edge of the bar arranged perpendicularly to the length thereof.

According to this invention, a vacuum or suction device picks cathode sleeves out of a reservoir, and in so doing, orients them parallel to each other. The vacuum device, then upon turning off the suction, deposits the cathodes in the holding rack. After the vacuum device has deposited its cathodes in the holding rack, the vacuum device is removed from the rack and the spray bar assembly is then placed over the supporting rack in such manner that grooves in the supporting rack are transverse to the resilient inserts comprising the supporting and shielding surfaces of the spray bar assembly members. Thereby the cathodes are clamped between the resilient inserts. Then the spray bar assembly is lifted off the support rack, taking the cathodes with it, whereby the cathodes are tightly held in parallel relation, with the ends covered, but without regard to which end is which in the end to end orientation thereof. The cathodes so held are then sprayed by running a spray gun once in each direction along each side of the spray bar fixture (four times in all), the spray gun being turned at an angle of 45° to the spray bar at each pass thereof along the fixture.

The invention is described in detail in the accompanying description and shown on the accompanying drawings in which:

FIG. 1 is a perspective view of a cathode of the type that is to be sprayed by the method and apparatus of this invention;

FIG. 2 is a perspective view of the vacuum operated pick-up means for partially orienting and picking up cathodes;

FIG. 3 is a perspective view of the vacuum means illustrated in FIG. 2 dropping the cathodes into an intermediate rack in accordance with this invention;

FIG. 4 is a plan view of the spray bar assembly fixture made according to this invention;

FIG. 5 is a section thereof on line 5—5 FIG. 4; and

FIG. 6 is a diagrammatic showing of a suitable spraying operation of the cathodes held in the spray bar.

FIG. 1 shows a cathode 10 that is to be sprayed with the electron emissive material and using our apparatus and method. The hollow cathode 10, which is of metal, has a closed end 12 and an open end 14 and is slightly conical in shape. The slope of the cone in FIG. 1 has been greatly exaggerated for purposes of illustration. As noted above, in an electron tube of which this cathode forms a part, no emissive material should be deposited on the end or inside thereof. Also, as noted above, while reasonable effort is taken to make the cathodes uniform in all dimensions, this is difficult using standard production methods, whereby cathodes vary slightly one from the other.

Cathodes such as that shown in FIG. 1 are made in great quantity and are dumped into a container such as 16 of FIG. 2 whereby they are randomly oriented. The cathodes are removed from the containers and are oriented to parallel position but without end for end orientation by a vacuum actuated rack-like cathode pick-up means 18.

Pick-up means 18 picks up randomly oriented cathodes 10 and orients them parallel to each other and includes a rack-like portion 26 having semi-cylindrical grooves 28 formed transversely of the rack and parallel to each other. Air passages 30 connect each groove 28 with an air suction hose 32. The hose 32 is inserted into the air passages in the handle 34 comprising a part of the pick-up means 18. An air valve, the handle 36 of which projects laterally from the handle 34 of the pick-up means 18, is provided for applying suction at the end of hose 32 to each groove 28. The width of the rack is a little less than the length of the cathodes to be picked up. The air hole at each groove is centrally located of the groove. The cathodes 10 that are picked up by the pick-up means 18 when the valve 34 is turned to the on position, must extend at least far enough into the groove to cover the suction hole therein. Therefore the cathodes that are picked up by the pick-up means 18 will extend short random distances beyond the side walls of the pick-up means 18. Also, since the cathodes will feed into the parallel grooves 28 when sucked up by the suction applied thereto, the cathodes in the grooves will be parallel but nevertheless randomly oriented as far as end for end relation is concerned.

The distance between the grooves 28 in the face of the pick-up means must be sufficient to obviate masking of one cathode by another in the latter spraying operation. The cathodes, when sprayed later, must be sufficiently far apart so that streamlines of the spray is not excessively distorted by the proximity of the cathodes. The minimum distances between grooves for various sizes of cathodes and various angles of the spray gun during the spraying operation may be determined by simple experiment.

Conveniently, a pair of pin-locating holes 38 are made in the ends of rack portion 26 beyond the grooved portion of the pick-up means for a purpose to be described. Upon turning on the suction and moving the pick-up means over the surfaces of the cathodes in supply reservoir 16, the cathodes will be picked up in each of the grooves 28 of the pick-up means 18. The pick-up means 18 holds the cathodes 10 until they are released and received in the grooves in the intermediate rack 20 as shown in FIG. 3 and then they are clamped in parallel relation but without end for end orientation between resilient inserts comprising parts of a spray bar assembly fixture 22 as shown in FIGS. 4 and 5. Having been securely clamped in fixture 22, the cathodes are sprayed by a spray gun 24 in the usual manner, the spray gun making four passes, two on each side of the fixture 22, the spray gun being oriented to be directed forwardly and to make about a 45° angle with the direction of travel thereof, as shown in FIG. 6. The intermediate support rack is shown in FIG. 3.

As shown in FIG. 3, the cathodes picked up by the pick-up means 18 are deposited in an intermediate rack 20 by which an intermediate step in the process is executed. This rack 20 is provided with an upstanding flange 40 having parallel semi-cylindrical grooves 42 transversely arranged of the flange 40. These grooves 42 have the same size and spacing as the grooves 28 in pick-up means 18. The flange 40 has the same width as the grooved portion of the pick-up means 18. A pair of locating pins 44 may extend from the top of rack 20 so that when pick-up means 18 is properly positioned thereon, the pins 44 will extend into holes 38. The flange is supported on a base 46 which is enlarged laterally and which has a T-shaped transverse section, as shown in FIG. 5. The rack is mounted in a groove 48 in the top surface of a support member 50. Locating pins (not shown) may extend from the bottom of the groove 48 and into complementary holes in the bottom of the enlarged portion 46 of rack 20 for proper registry of the rack 20 and its base 50. Also, pins 52' extend from the top surface of base 50 laterally positioned with respect to the groove 48 for a purpose to be described. When pick-up means 18 is properly placed on rack 20, pins 44 of rack 20 will enter holes 38 of pick-up means 18 and the semi-cylindrical grooves of pick-up means 18 will register with semi-cylindrical grooves 42 in the rack. The suction is then turned off by turning the valve handle 36 to the off position as shown in FIG. 3 whereby the cathodes are no longer retained by the pick-up means 18 but are received in the grooves 42 of the rack 20. The pick-up means 18 is then removed from the rack 20 leaving the cathodes 10 in the grooves 42. As noted above, the cathodes extend at least a small amount further than half way across the top rack 20 and, since the rack is a little narrower than the lengths of the cathodes, the cathodes extend varying small amounts beyond the sides of the rack at this time. A clamp comprising the spray bar assembly 22 of FIGS. 4 and 5 is placed over the rack 20 in such manner that the cathodes extend between the spray bar members comprising the spray bar assembly.

The spray bar assembly 22 of this invention is shown in FIGS. 4 and 5 and comprise upper and lower spray bar members 52 and 54. The bottom edge of the upper member 52 and the top edge of the lower member 54 are chamfered along the intermediate part thereof at 56 and 58, respectively. Resilient rubber inserts 60 and 62 are set into the upper and lower members 52 and 54, one in each of the facing edges of the spray bar members. As shown in FIGS. 4 and 5 the rubber inserts 60 and 62 extend beyond the edges of the members 52 and 54. The lower member 52 has two holes 64 and 66, at the ends thereof and perpendicular to the facing edges of the members. A portion of the lower member 54 is cut away at the holes 64 and 66 to form recesses 68 and 70. Pins 72 and 74, each fastened to upper spray bar member 52 at opposite ends thereof, extend into holes 64 and 66 in lower spray bar member 54, and springs 76 and 78 are held on pins 72 and 74 respectively by nuts 80 and 82. The springs 76 and 78 urge spray bar members 52 and 54 towards each other. Adjustable set screws 84 and 86 fit into upper spray bar 52 between the posts 72 and 74 and the adjacent ends of the rubber insert 60 and extend adjustably towards lower spray bar 54 to limit the distance that the spray bars can approach each other.

Bearing pads 88 and 90 are fastened to the inside of each end of the lower members 54 beyond the holes 64 and 66 for cooperation with cam means 92 and 94 mounted on upper member 52. The cam members 92 and 94 are mounted in bifurcations of the upper spray bar 52 on pins 96 and 98 respectively at notched away end portions thereof. Cam levers 100 and 102 are respectively fastened to the cam members 92 and 94 for rotation of their respective cam members. Upon rotation of levers 100 and 102, the high parts of the cam members 92 and 94 engage the bearing pads 88 and 90, respectively, to force the spray bar members 52 and 54 apart against the urging of springs 76 and 78. Holes 112 are provided in the upper spray bar member for receiving locating pins 52' which are set in base 50.

Having described the spray bar fixture, the manner in which it is to be used will be described. Upon depositing the cathodes 10 in the grooves of the rack 20, the spray bar assembly is opened by so rotating the cams 92 and 94 that the high parts thereof bear on bearing pads 88 and 90. With the cams 92 and 94 in such position the distance between the facing edges of the resilient inserts 60 and 62 is at a maximum and it is sufficient to encompass any cathodes that have been deposited on rack 20 including those cathodes which are not centrally located on rack 20. The spray bar assembly is positioned on base 50 in such manner that locating pin 52' projecting from base 50 extends through locating holes 112 in the upper spray bar member 52. The spray bar assembly members 52 and 54 will then lie on opposite sides of up-standing flange 40 of rack 20 and upon moving the cam means 92 and 94 back to the inoperative position shown in FIG. 4, the rubber inserts 60 and 62 will be moved towards each other by springs 76 and 78 and the cathodes will be clamped between the rubber inserts 60 and 62. Due to the resiliency of the inserts, the ends of the cathodes 10 will individually be embedded into or will indent the rubber inserts 60, 62 sufficiently to hold any cathode 10, though it may vary by a small amount in length or in diameter from other cathodes and though the cathodes are oriented randomly end for end. Thereby the closed top and the open bottom of the cathode will be shielded from the subsequently applied spray of electron emissive material by the resilient inserts 60 and 62.

Having clamped the cathodes to be sprayed between the rubber inserts 60 and 62 of the spray bar assembly 22, the cathode may be sprayed by a spray gun 24, as illustrated in FIG. 6. As shown in this figure, spray gun 24, which is directed at an angle of about 45° to the shielded assembly is moved in a path parallel to the center of the spray bar assembly until each cathode has been sprayed on a quadrant of the surface thereof. At such a spray angle, the axis of the cathodes should be separated a sufficient distance from each other to permit proper spraying of the cathodes as discussed above. The spray gun is then turned at 90° as shown in 24' and the cathodes are again sprayed in a similar manner on another quadrant of the surfaces thereof by moving the spray gun back along the spray bar assembly. To spray the cathodes on the remaining two quadrants thereof, the rack is turned at 180°. The spray gun is moved as before. Or the gun may be moved to the other side of the spray bar assembly and the gun may be pointed at a 45° angle to the spray bar and it may be moved in a path parallel with respect to the bar, and back after turning the gun 90°. By this method, the cathodes are sprayed directly on a part of each quadrant of their cylindrical peripheries and twice in an overlapping manner on the outlying parts of the quadrant, whereby the coating of the cathode will be sufficiently uniform for their use in vacuum tubes.

While we have described our invention in connection with spraying cathodes for a particular type of vacuum tube with electron emissive material, it is clear that our method is adapted for spraying any type of cathode or, in fact, any objects where no spray should be deposited on the ends of or inside of such objects if they be hollow. Furthermore, while we have particularly described spraying as the manner in which a coating is applied to the cathodes, it is clear that after they have been clamped in the spray bar assembly 22, the coating may be applied in any known manner.

What is claimed is:

1. The method of applying a coating to objects, which comprises presenting a vacuum means having recesses therein to a reservoir containing said objects, whereby objects are picked up in said recesses, depositing said objects into recesses of a supporting member, clamping said objects between resilient members of a second supporting member to shield the surfaces of said objects in contact with said resilient members, and spraying said objects while in said supporting member.

2. The method of applying a coating to tubular objects which comprises the steps of arranging a plurality of said objects in parallel array and removing said objects from a reservoir containing said objects, depositing said objects in a temporary supporting member in said parallel array, clamping said objects between resilient members of a second supporting member to embed the ends of said objects in said resilient members to shield the ends of said objects with said resilient members, and spraying said objects while in said second supporting member.

3. The method of applying a coating to tubular objects which comprises the steps of arranging a plurality of said objects in parallel array and removing said objects from a reservoir containing said objects, depositing said objects in a temporary supporting member in said parallel array, clamping said objects between resilient members of a second supporting member to embed the ends of said objects in said resilient members to shield the ends of said objects with said resilient members, removing said temporary supporting member from contact with said tubular objects, and spraying said objects while in said second supporting member.

4. The method of applying an emitting coating to tubular cathode sleeves which comprises the steps of arranging a plurality of said sleeves in parallel relationship and removing said so-arranged sleeves by vacuum from a reservoir containing said sleeves, depositing said sleeves in a temporary supporting member, clamping said sleeves between resilient members of a second supporting member to embed the ends of said sleeves in said resilient members to shield the ends of said sleeves with said resilient members, and spraying said sleeves while in said second supporting member.

5. The method of applying an emitting coating to tubular cathode sleeves, which comprises the steps of arranging a plurality of said sleeves in parallel relationship, depositing said sleeves in a temporary supporting member, clamping said sleeves between resilient members of a second supporting member to embed the ends of said sleeves in said resilient members to shield the surfaces of said sleeves in contact with said resilient members, while in said second supporting member, and spraying said sleeves while in said second supporting member.

6. The method of applying an emitting coating to tubular cathode sleeves which comprises the steps of arranging a plurality of said sleeves in parallel relationship, depositing said sleeves in a temporary supporting member, clamping said sleeves between resilient members of a second supporting member to shield the surfaces of said sleeves in contact with said resilient members, removing said temporary supporting member from contact with said sleeves, and spraying said sleeves while in said second supporting member.

7. A clamping assembly comprising a plurality of parallel bar members, each of said bar members having a side facing a side of another bar member, spring means for urging said bar members towards each other and a resilient gripping insert having a continuous surface fixed to each of the facing sides of said bar members.

8. A clamping assembly comprising a plurality of parallel bar members, each bar member having a side facing the side of another bar member, spring means for urging said bar members towards each other, cam means for moving said bar members apart and a resilient insert set into each of the facing sides of said members.

9. The combination of a rack comprising an upstanding flange having grooves running transversely of the length of the flange in a surface of said flange and a clamping assembly comprising a plurality of parallel bar members, each bar member having a side facing a side of another bar member, spring means for urging said bar members towards each other and a resilient means having a continuous surface set in the facing sides of each of the bar members, and means for locating said clamping means with respect to said rack so that said bar members are parallel to said flange.

10. Apparatus for holding tubular cathode sleeves to be sprayed with emitting material including a clamping assembly and a cooperating rack for holding cathode sleeves in spaced parallel array during insertion of the cathodes into the said clamping assembly; said clamping assembly including a pair of oppositely disposed bar members, biasing means connected to said bar members for urging said bar members towards each other, means connected to said bar members for forcing said bar members away from each other, resilient means extending along and fixed to the oppositely disposed surfaces of said bar members, said rack being formed to extend between the bar members while fitted between said bar members to position the tubular cathode sleeves between said resilient means whereby the ends of said cathode sleevs may be engaged by said resilient means when the bar members are moved toward each other to clamping position whereby the ends of said cathodes are embedded in and shielded by said resilient means.

11. Apparatus for holding tubular cathode sleeves to be sprayed with emitting material, including a clamping assembly and a cooperating rack for holding cathode sleeves in spaced parallel array during insertion of the cathodes into the said clamping assembly; said clamping assembly including a pair of oppositely disposed bar members, said bar members having means for guiding said bar members toward and from each other, biasing means connected to said bar members for urging said bar members towards each other, means connected to said bar members for forcing said bar members away from each other, resilient means extending along and fixed to the oppositely disposed surfaces of said bar members, said rack being formed to extend between the bar members while fitted between said bar members to position the tubular cathode sleeves between said resilient means whereby the ends of said cathode sleeves may be engaged by said resilient means when the bar members are moved toward each other to clamping position whereby the ends of said cathode sleeves are embedded in and shielded by said resilient means.

12. Apparatus for holding tubular cathode sleeves to be sprayed with emitting material including a clamping assembly and a cooperating rack for holding cathode sleeves in grooves in spaced parallel array in a surface of said rack during insertion of the cathodes into the said clamping assembly; said clamping assembly including a pair of oppositely disposed bar members, said bar members having means for guiding said bar members toward and from each other, biasing means connected to said bar members for urging said bar members towards and from each other, means connected to said bar members for forcing said bar members away from each other, resilient means extending along and fixed to the oppositely disposed surfaces of said bar members, said rack being formed to extend between the bar members with said grooved surface up while fitted between said bar members to position the tubular cathode sleeves between said resilient means whereby the ends of said cathode sleeves may be engaged by said resilient means when the bar members are moved toward each other to clamping position whereby the ends of said cathodes are embedded in and shielded by said resilient means.

References Cited in the file of this patent

UNITED STATES PATENTS

| | | |
|---|---|---|
| 1,526,405 | Williams | Feb. 17, 1925 |
| 2,786,444 | Marrs | Mar. 26, 1957 |
| 2,858,597 | Kraemer | Nov. 4, 1958 |
| 2,977,930 | Grimone | Apr. 4, 1961 |